June 20, 1950   H. C. JOHNSON   2,511,984
JUICE EXTRACTOR

Filed Nov. 24, 1944   2 Sheets-Sheet 1

Inventor
Herbert C. Johnson
BY
Davis, Lindsey, Smith & Shonts
Attorneys.

June 20, 1950    H. C. JOHNSON    2,511,984
JUICE EXTRACTOR

Filed Nov. 24, 1944    2 Sheets-Sheet 2

Inventor
Herbert C. Johnson
BY
Davis, Lindsey, Smith & Shonts
Attorneys.

Patented June 20, 1950

2,511,984

UNITED STATES PATENT OFFICE 2,511,984

JUICE EXTRACTOR

Herbert C. Johnson, Wilmette, Ill.

Application November 24, 1944, Serial No. 564,946

2 Claims. (Cl. 100—42)

The invention relates generally to juice extractors and more particularly to the type especially suited for use in extracting the juice of citrus fruits.

The general object of the invention is to provide a juice extractor of the foregoing type having an improved squeeze element so constructed that, in squeezing a half fruit, the pulp is prevented from being forced out of the squeezing area and is retained therein so that it is subjected to pressure to express the juice therefrom.

Another object is to provide an extractor of the foregoing type having a novel squeeze element so constructed that the pulp is retained within the squeezing area and the juice resulting therefrom is permitted to drain directly from the point of pressure through a multitude of drain holes provided adjacent the pulp retaining means.

A further object is to provide an extractor of the foregoing type having a novel squeeze element provided with ridges extending transverse to the direction of pressure to retain the pulp within the squeezing area and with the ridges having sharp corners to cut into the pulp cells and release the juice therefrom.

Still another object is to provide an extractor of the foregoing type having a novel squeeze element provided with pulp retaining means and drains adjacent thereto which are so positioned as to readily drain the juice from the pulp without becoming clogged by the latter.

Other objects and advantages will become apparent from the following description taken in connection with the accompanying drawings, in which.

Juice extractors of a character adapted for domestic use, particularly the type for squeezing oranges, are usually arranged to squeeze a half fruit at a time. In extractors of this character, the half fruit is adapted to be placed on a lower fixed squeezing element of generally conical form and is adapted to be pressed against the element by a movable upper squeezing element conforming generally to the conical shape of the lower element. In the squeezing operation, there is a tendency to force the pulp from the fruit downwardly beyond the lower edge of the rind, creating a fringe of pulp extending from the rind. Because of the thickness of the rind and its ability to hold the squeezing elements slightly separated, the pulp constituting such a fringe is not subjected to any material pressure. Consequently, the juice contained in this pulp is lost since the pulp is composed of cells containing the greater part of the juice of the fruit. Moreover, the juice that is released from the fruit has a tendency to run into the fringe of pulp and be absorbed thereby rather than to drain off.

While in some extractors heretofore made, means have been provided to prevent the formation of the fringe of pulp and to retain it within the squeezing area, the juice in the pulp cells is obtained solely by causing the cells to burst under the pressure. Such mode of releasing the juice from the cells is obviously inefficient. Moreover, even though the pulp is retained within the squeezing area, the juice is drained only down the outer surface of the lower squeeze element so that any juice remaining within the squeezing area at the time pressure was released was reabsorbed by the pulp. Thus, with extractors of this type, the maximum amount of juice from the fruit could not be obtained.

In the present extractor, the lower squeeze element is so constructed that the pulp is retained within the squeezing area throughout the operation and the juice is drained off as soon as released so that very little of it, if any, will be reabsorbed by the pulp when the pressure is released. Moreover, the squeeze element is so constructed as to cut into the pulp cells to release the juice therefrom, rather than to burst them by pressure. A maximum number of cells are, therefore, ruptured without an excess of pressure so that the maximum amount of juice is obtained from the fruit. By obtaining the juice from the pulp without excess pressure, a minimum amount of the bitters oils in the rind is released so that the juice is of the desired quality.

Figure 1:
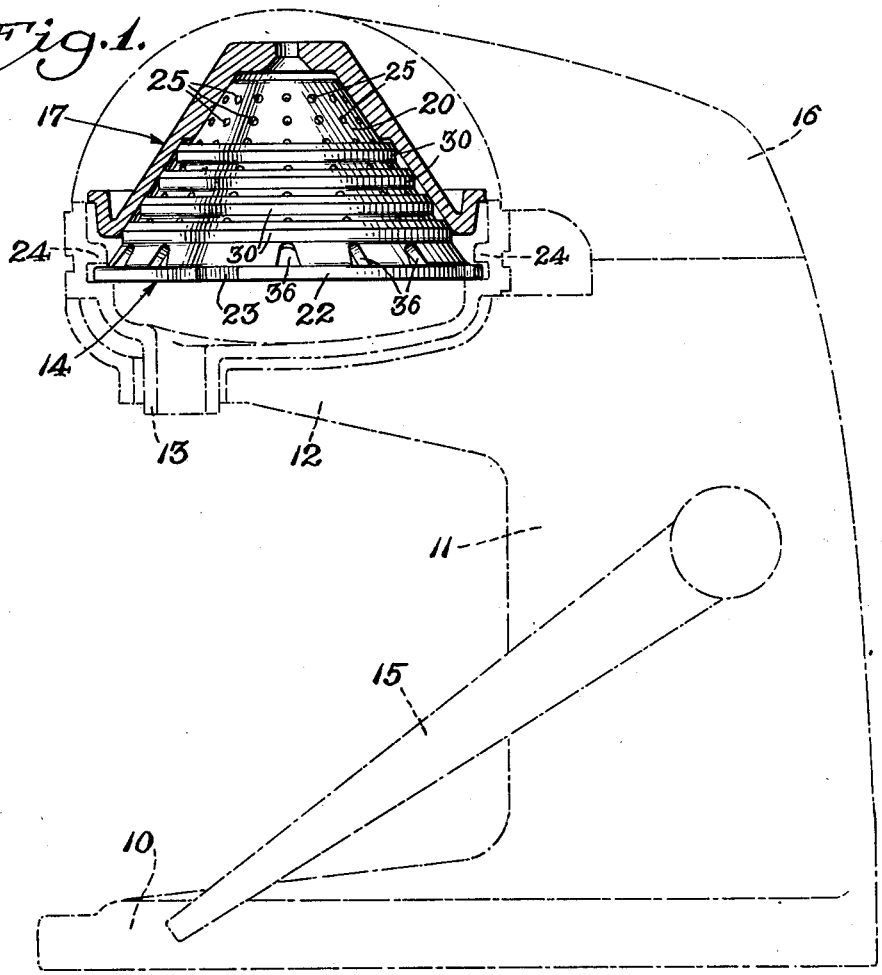
Figure 1 is an elevational view showing a juice extractor in dotted lines with the squeeze elements thereof in full lines, the lower squeeze element embodying the features of the invention.

In Fig. 1 of the drawings I have shown an extractor of a character adapted to utilize a squeeze element embodying the features of the invention. Thus, the extractor comprises a base 10 adapted to support a glass or other container to receive the juice. Extending upwardly from the base is an upright 11 having a bracket portion 12 provided with a drain spout 13 and adapted to support a lower squeeze element, indicated generally at 14. Mounted within the upright 11 is mechanism (not shown) adapted to be operated by a hand lever 15, for vertically moving a head 16 having secured thereto an upper squeeze element, indicated generally at 17.

By turning the hand lever 15, the head 16 may be raised and a half fruit placed on the lower squeeze element 14. On reversely turning the hand lever 15, the head 16 is moved downwardly, and the half fruit is squeezed between the two squeeze elements 14 and 17, the juice draining downwardly in the bracket portion 12 and through the drain spout 13 into the container mounted on the base 10.

The lower squeeze element 14 is constructed to embody the features of the invention and is of generally truncated conical form having a conical side wall 20, a top wall 21 and an annular flange 22 at its bottom. The flange 22 may be provided with a plurality of peripheral notches 23 to permit the flange to pass below lugs 24 formed in the bracket portion of the extractor, the squeeze element thereafter being slightly turned to hold the squeeze element in place in the bracket.

The upper portion of the conical wall 20 is provided with a plurality of annular rows of holes 25 to drain juice from the central part of the fruit during squeezing. The top wall 21 is also preferably provided with a plurality of holes 26 for this purpose and is slightly dished in form. Below the smooth upper portion of the conical wall 20, I provide a plurality of annular ridges 30 formed integrally with the conical wall, concentrically therewith and projecting outwardly. The ridges 30 are located on the conical surface in such position as to engage the fruit from the lower edge of the rind upwardly and into the body of the fruit a substantial distance to prevent the pulp of the fruit from being forced downwardly beyond the edge of the rind. Thus, the pulp will be retained within the squeezing area so that the cells of which the pulp is composed will be fully subjected to the squeezing pressure.

The ridges 30 perform the further function of being shaped to cause rupture of the pulp cells to release the juice therefrom. Thus, each ridge is provided with a sharp corner 31 adapted to cut into the pulp cells so that excessive pressure does not have to be utilized to cause the rupture thereof. By being able to rupture the cells without excessive pressure, the juice is released therefrom and a minimum amount of bitter oil from the rind is released.

Figure 2:
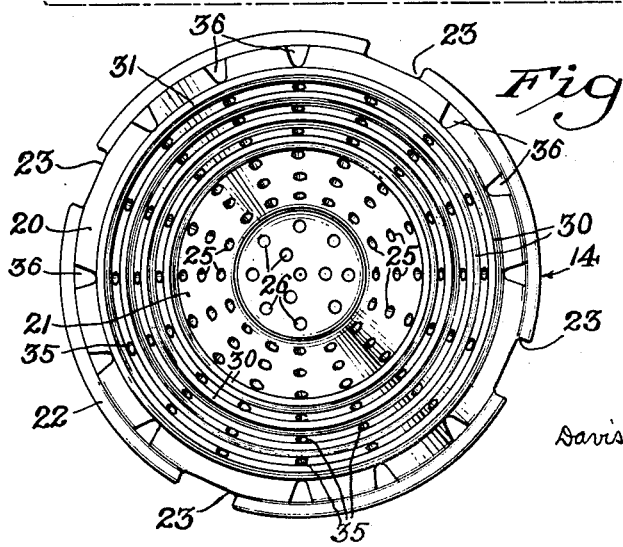
Fig. 2 is a plan view of the lower squeeze element shown in Fig. 1.
Figure 3:
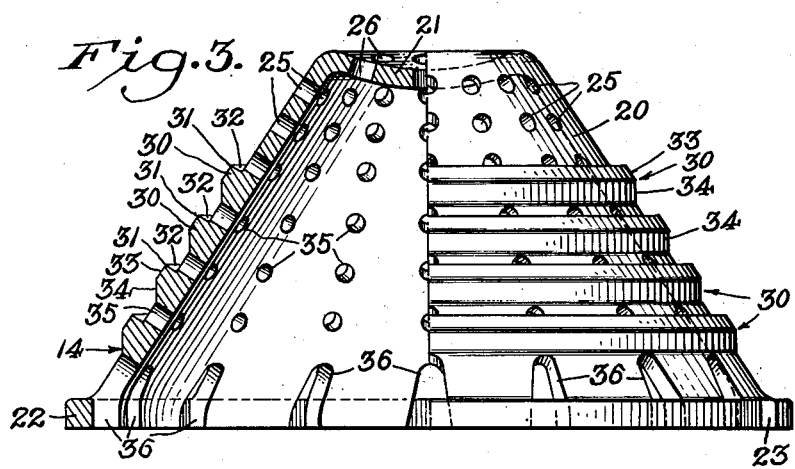
Fig. 3 is an enlarged elevational view, partially in section, of the lower squeeze element shown in Fig. 1.

In the preferred form of squeezing element shown in Figs. 1, 2 and 3, the sharp corner 31 on each ridge 30 is formed by a surface 32 extending perpendicularly to the conical surface 20 and a surface 33 extending parallel thereto. The rear or lower edge of each ridge 30 is provided by a surface 34 preferably extending parallel to the axis of the squeeze element and spaced a substantial distance from the next ridge below it.

The squeeze element is also provided with means for draining the juice away from the pulp as soon as it is released from the cells thereof so that the juice will not be reabsorbed by the mass of pulp when the pressure is released. To this end, I provide a plurality of annular rows of drain holes 35 positioned in the spaces between the ridges 30 so that there is a row of holes immediately adjacent the sharp corners 31 which cut the pulp cells and release the juice therefrom. The upper surface 32 of each ridge, since it is perpendicular to the conical surface, thus constitutes a ledge acting to drain the juice toward the drain holes so that the juice is immediately removed, upon release, from the squeezing area and no large amount of juice will thereby be retained within the squeezing area to be reabsorbed by the pulp when the pressure is released. The position of the drain holes 35 in the conical surface of the squeeze element is such that, while they provide for free draining of the juice released, there is no great tendency for the pulp to clog them since the pulp is forced outwardly and held against the rind by the ridges 30.

In the lower part of the squeeze element, I provide further drain apertures 36 of upwardly elongated form and located at the point where the conical surface 20 meets the flange 22. Thus, any juice running down the conical surface 20 below the ribs 30 will be drained off. However, by so locating the apertures 36, the flange 22 remains integral to provide the desired strength.

From the foregoing, it will be apparent that with the squeeze element shown herein, the pulp is prevented from being forced out of the squeezing area and is retained in such area so that the juice may be obtained therefrom. By retaining the pulp in the pressure or squeezing area, it may be subjected to the cutting action of the sharp corners of the ridges so that the juice in the pulp cells is readily released without an axcess of pressure. By thus holding the pressure at a minimum, a minimum quantity of bitter oils from the rind is released. The rows of drain holes being interspersed between the ridges carry off the juice so released from the pulp cells and prevent it from being reabsorbed by the pulp when the pressure is released. Thus, with a squeeze element of the character herein disclosed, a maximum amount of juice from the fruit is obtained with a relatively small pressure.

I claim:

1. A squeeze member for an extractor of the character described comprising a conical element having a plurality of outwardly projecting annular concentric ridges on its conical surface, each ridge being defined by the surface of revolution of a line parallel to the line generating the conical element, a line at right angles to the first mentioned line, and a line parallel to the axis of rotation of said conical element, the space between the ridges providing space for the pulp, and the sharp annular edge defined by the surface of revolution of said first and third mentioned lines being adapted to cut into the pulp cells and release juice therefrom, and there being drain openings closely adjacent the surfaces defined by the surface of revolution of said first and second mentioned lines to drain off the juice so released.

2. A squeeze member for an extractor of the character described comprising a conical element having a plurality of concentric rows of drain openings through the conical surface of said element, and a plurality of outwardly projecting annular concentric ridges between said rows, each ridge having an upper, conoidal surface slanting downwardly toward the adjacent row of drain openings to direct the juice thereto, an outer surface defined by the surface of revolution of a line parallel to the line generating the conical element, and a lower cylindrical surface intersecting said conical element adjacent the next lower row of drain openings, said outer surface intersecting said upper conoidal surface and said lower cylindrical surface and forming respectively therewith sharp annular edges adapted to cut into the pulp cells and release the juice therefrom.

HERBERT C. JOHNSON.

REFERENCES CITED

The following references are of record in the file of this patent:

UNITED STATES PATENTS

| Number | Name | Date |
|---|---|---|
| 1,850,001 | D'Annunzio et al. | Mar. 15, 1932 |
| 1,958,570 | Flegel | May 15, 1934 |
| 2,142,975 | Majewski, Jr. | Jan. 3, 1939 |
| 2,245,726 | Seyfried | June 17, 1941 |
| 2,306,884 | Jakovicz | Dec. 29, 1942 |
| 2,220,372 | Johnson | Nov. 5, 1940 |
| 2,018,932 | Thorne | Oct. 29, 1935 |